US012775077B2

(12) United States Patent
Zhou

(10) Patent No.: US 12,775,077 B2
(45) Date of Patent: Oct. 27, 2026

(54) LASER RECEIVING CIRCUIT AND LiDAR

(71) Applicant: SUTENG INNOVATION TECHNOLOGY CO., LTD., Shenzhen (CN)

(72) Inventor: Xiaojun Zhou, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 677 days.

(21) Appl. No.: 18/212,169

(22) Filed: Jun. 20, 2023

(65) Prior Publication Data

US 2023/0333223 A1 Oct. 19, 2023

Related U.S. Application Data

(63) Continuation of application No. PCT/CN2020/140375, filed on Dec. 28, 2020.

(51) Int. Cl.
*G01S 7/48* (2006.01)
*G01S 7/486* (2020.01)
*G01S 7/4861* (2020.01)

(52) U.S. Cl.
CPC .......... *G01S 7/4868* (2013.01); *G01S 7/4861* (2013.01)

(58) Field of Classification Search
None
See application file for complete search history.

(56) References Cited

U.S. PATENT DOCUMENTS 4,595,847 A * 6/1986 Weir .................. H03K 17/6874 327/434
2007/0152731 A1 7/2007 Imai et al.
2018/0180470 A1 6/2018 Seitz

FOREIGN PATENT DOCUMENTS

| | | | |
|---|---|---|---|
| CN | 102006042 | A | 4/2011 |
| CN | 102158216 | A | 8/2011 |
| JP | 2004080903 | A | 3/2004 |

OTHER PUBLICATIONS

First Office Action of the Chinese application No. 202080005492.7, issued on Sep. 13, 2023. 12 pages.
European Search Report issued in related European Application No. 20967330.0, mailed Dec. 20, 2023, 10 pages.
International Search Report issued in corresponding International Application No. PCT/CN2020/140375, mailed Sep. 3, 2021, 5 pages.

* cited by examiner

*Primary Examiner* — Hovhannes Baghdasaryan
(74) *Attorney, Agent, or Firm* — BAYES PLLC

(57) ABSTRACT

A laser receiving circuit and a LiDAR are provided. The laser receiving circuit includes a controller, a voltage switching circuit, n voltage sources, and a receiving sensor. The voltage switching circuit includes a control terminal, n power source input terminals, and a power source output terminal. The n voltage sources generate reverse bias signals of different voltage values, respectively, and are connected to the n power source input terminals in a one-to-one manner. The controller is connected to the control terminal of the voltage switching circuit and is configured to send voltage switching signals to the voltage switching circuit via the control terminal. The power source output terminal is connected to a cathode of the receiving sensor. The voltage switching circuit is configured to select one power source input terminal from the n power source input terminals to be turned on, in response to the voltage switching signals.

9 Claims, 8 Drawing Sheets

LASER RECEIVING CIRCUIT AND LiDAR

CROSS-REFERENCE TO RELATED APPLICATION

This application is a continuation of International Application No. PCT/CN2020/140375, filed on Dec. 28, 2020. The disclosure of the aforementioned application is hereby incorporated by reference in its entirety.

TECHNICAL FIELD

The present application relates to the field of LiDAR, and in particular, to a laser receiving circuit and a LiDAR.

BACKGROUND

Since LiDAR for unmanned driving needs to meet requirements of a longer detection distance, a gain of a receiving circuit is usually set to be relatively large to improve a signal-to-noise ratio and ranging ability. However, this causes a problem that an echo generated by an object with a short distance and high reflectivity enters deep saturation, resulting in waveform distortion and nonlinear distortion, and causing inaccurate ranging and high anti-expansion, bending, transitional drag points, and other point cloud problems, which seriously affects a performance of the LiDAR.

Therefore, how to improve a dynamic range required by the LiDAR and quickly adjust the gain of the receiving sensor is an urgent problem to be solved at present to meet requirements of the LiDAR for detection distance and detection accuracy.

A laser receiving circuit and a LiDAR are provided by embodiments of the present application, which can increase a dynamic range required by the LiDAR and quickly adjust a gain of a receiving sensor.

In a first aspect, embodiments of the present application provide a laser receiving circuit, including: a controller, a voltage switching circuit, n voltage sources, and a receiving sensor, where n is an integer greater than 1. The voltage switching circuit is provided with a control terminal, n power source input terminals, and a power source output terminal. The n voltage sources generate reverse bias signals of different voltage values, respectively.

The n voltage sources are connected to the n power source input terminals in a one-to-one manner. The controller is connected to the control terminal of the voltage switching circuit. The power source output terminal is connected to a cathode of the receiving sensor.

The controller is configured to send voltage switching signals to the voltage switching circuit via the control terminal.

The voltage switching circuit is configured to select one power source input terminal from the n power source input terminals to be turned on in response to the voltage switching signals, so that the corresponding voltage source loads the reverse bias signals to the receiving sensor via the selected power source input terminal and the power source output terminal. The corresponding voltage source is a voltage source connected to the selected power source input terminal. Except for the selected power source input terminal, the other power source input terminals are in an off state, that is, only one voltage source loads the generated reverse bias signals to the receiving sensor.

In a second aspect, embodiments of the present application provide a LiDAR, including the forgoing laser receiving circuit.

The beneficial effects provided by the technical solutions of some embodiments of the present application include at least the following.

By switching different voltage sources to provide the reverse bias signals of the different voltage values for the receiving sensor, the present application solves a problem of a slow adjustment response speed of the reverse bias signals of the different voltage values obtained by a voltage conversion manner in the related art. By presetting a plurality of voltage sources of different voltage values, when adjusting the voltage value of the reverse bias signals of the receiving sensor is needed, the present application only needs to turn on a corresponding power input interface to load the reverse bias signals of a specified voltage value to the receiving sensor. An adjusted response time is mainly the time to turn on a corresponding power input port. Compared with voltage conversion, the present application has a faster response speed when adjusting the gain of the receiving sensor.

BRIEF DESCRIPTION OF DRAWINGS

To explain embodiments of the present application or the technical solutions more clearly, the following briefly introduces the drawings. Obviously, the drawings in the following description are only some examples of the present application.

DETAILED DESCRIPTION

To make objectives, technical solutions, and advantages of the present application clearer, embodiments of the present application are described in further detail below with reference to the drawings.

Figure 1:
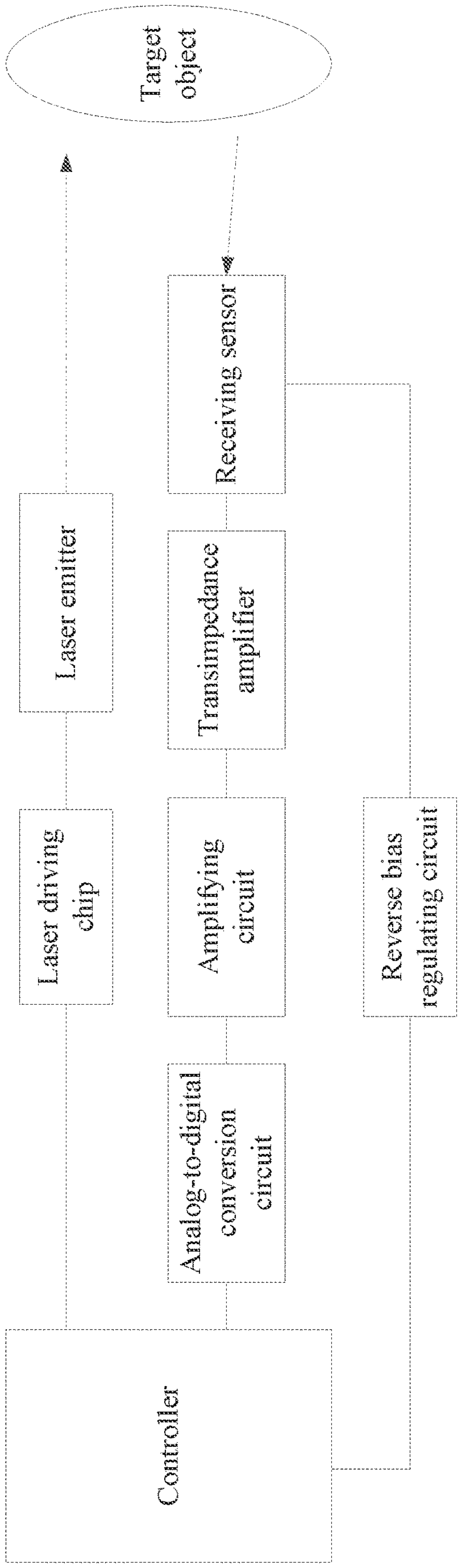
FIG. 1 is a schematic structural diagram of a circuit of a LiDAR in a related art according to some embodiments of the present application.

FIG. 1 shows a schematic structural diagram of a circuit of a LiDAR. The LiDAR includes a laser emitting circuit and a laser receiving circuit. The laser emitting circuit includes a controller, a laser driving chip, and a laser transmitter. The laser receiving circuit includes a controller, an analog-to-digital converter, an amplifying circuit, a transimpedance amplifier, a receiving sensor, and a reverse bias voltage regulating circuit. The laser emitting circuit and the laser receiving circuit can share one controller, or a separate controller can be provided, which is not limited in embodiments of the present application. The controller has a control function and a processing function in the LiDAR. The controller can be realized by at least one hardware form of digital signal processing (DSP), a field-programmable gate array (FPGA), and a programmable logic array (PLA). The laser transmitter includes a GaN MOS transistor and a laser diode LD. The receiving sensor includes an APD (an avalanche photon diode) or an SIPM (silicon photomultiplier), and the receiving sensor has a cathode and an anode.

The LiDAR is configured to measure flight time from laser signals to a target object, and then calculate a distance between the LiDAR and the target object with the flight time. An operating process of the LiDAR in the present application includes the following.

The controller controls a laser driving circuit so that the GaN MOS transistor generates high-power pulse current signals, excites the laser diode to emit laser signals, and records a timestamp of the emitted laser signals. The laser signals reach the target object and reflect back. The receiving sensor receives emitted echo laser signals. The receiving sensor converts the echo laser signals into current signals. The transimpedance amplifier converts the current signals into voltage signals. The amplifying circuit amplifies the voltage signals. The analog-to-digital converter performs analog-to-digital conversion of the amplified voltage signals to obtain digital signals, and transmits the digital signals to the controller. The controller determines a timestamp of the received echo laser signals and an amplitude of the digital signals according to the digital signals, then calculates the flight time according to the timestamp of the emitted laser signals and the timestamp of the received echo laser signals, thus calculates a distance between the LiDAR and the target object according to the flight time, and calculates a reflectivity rate of the target object according to the amplitude of the digital signals.

In order that the receiving sensor achieves a certain gain, the reverse bias voltage regulating circuit needs to apply one reverse bias signal to the receiving sensor, and the magnitude of the reverse bias signals is adjustable to compensate for an effect of a temperature change on the gain of the receiving sensor.

In a multi-channel LiDAR, the number of channels is 16, 32, 64, 128, or other possible numbers, and a point cloud refreshing rate is about 20 KHz. For a 16-channel LiDAR, the ranging time of a single channel is about 50 μs/16=3.125 μs. In order that a hardware design of the LiDAR is simplified, the receiving sensor of each of the channels shares one reverse bias voltage. However, the magnitude of the reverse bias signals required by the receiving sensor of each of the channels may be different. A power source of each of the channels adjusts the magnitude of the reverse bias signals in a DC voltage conversion manner. Response time of this manner is in milliseconds (about 1.0 ms). The LiDAR is required to complete adjustment of a magnitude of the reverse bias voltage within 300 ns. Therefore, the laser receiving circuit cannot meet requirements of fast adjustment of the reverse bias signals.

Figure 2:
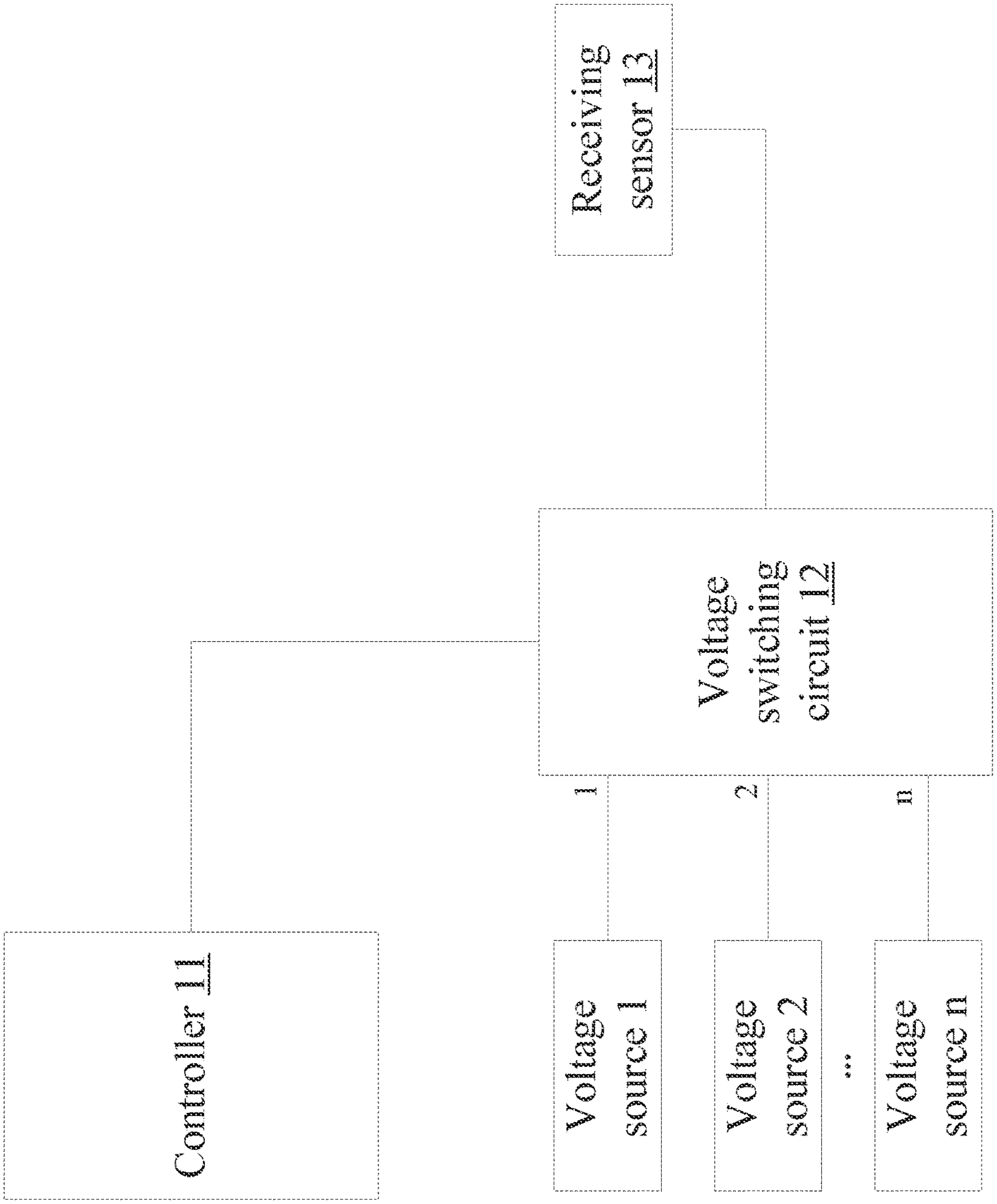
FIG. 2 is a schematic structural diagram of a laser receiving circuit according to some embodiments of the present application.

To solve the forgoing problems, the present application provides a laser receiving circuit. As shown in FIG. 2, in some embodiments of the present application, the laser receiving circuit includes a controller 11, n voltage sources, a voltage switching circuit 12, and a receiving sensor 13. n is an integer greater than 1. The voltage switching circuit 12 is provided with n power source input terminals, a control terminal, and a power source output terminal. Then voltage sources generate reverse bias signals of different voltage values. The n voltage sources are connected to the n power source input terminals arranged on the voltage switching circuit in a one-to-one manner, that is, one voltage source is connected to one power source input terminal. A voltage source 1 is connected to a power source input terminal 1, a voltage source 2 is connected to a power source input terminal 2, . . . , a voltage source n is connected to a power source input terminal n. The controller 11 is connected to the control terminal of the voltage switching circuit 12. The power source output terminal of the voltage switching circuit 12 is connected to a cathode of the receiving sensor 13, thereby providing the receiving sensor 13 with re-verse voltage signals (the reverse bias signals).

The number of control terminals provided on the voltage switching circuit 12 is related to the number n of power source input terminals.

Embodiment a: the number of control terminals is equal to the number of power source input terminals, that is, a voltage switching circuit is provided with n control terminals and n power source input terminals. The n control terminals and the n power source input terminals are in a one-to-one mapping relationship. A controller sends voltage switching signals to the voltage switching circuit via the n control terminals. The voltage switching signals are represented by n bits. The value of the bit is 0 or 1. 0 means low level signals on the control terminal, and 1 means high level signals on the control terminal. Only one of the n bits has a value of 1. A certain mapping relationship is provided between values of the n bits and serial numbers of the power source input terminals. The voltage switching signals determine the power source input terminal that needs to be turned on, according to the mapping relationship.

For example: n=4, a mapping relationship between a level value of the voltage switching signals and the serial number of the power source input terminal is shown in Table 1.

TABLE 1

| The level value of the voltage switching signals | The power source input terminal |
|---|---|
| 1000 | 1 |
| 0100 | 2 |
| 0010 | 3 |
| 0001 | 4 |

It is assumed that the controller sends the voltage switching signals to the voltage switching circuit via four control terminals. The voltage switching circuit determines that the level value of the voltage switching signals is 0100. According to the mapping relationship in Table 1, the power source input terminal with the sequence number 2 that needs to be turned on is determined. The reverse bias signals of the voltage source corresponding to the power source input terminal 2 are loaded to the receiving sensor.

Embodiment b: n=2m, m is the number of control terminals, and n is the number of power source input terminals. A controller 11 outputs high level signals or low level signals on the m control terminals, so that the m control terminals have n different level values. Each of the level values corresponds to one power source input terminal. A certain mapping relationship is provided between the level value and a serial number of the power source input terminal.

For example: n=4, m=2, the mapping relationship between the level value and the serial number of the power source input terminal is shown in Table 2.

TABLE 2

| The level value of the voltage switching signals | The serial number of the power source input terminal |
|---|---|
| 00 | 1 |
| 01 | 2 |
| 10 | 3 |
| 11 | 4 |

When the controller 11 outputs the low level signals on a first control terminal and the low level signals on a second control terminal, a voltage switching circuit 12 detects that voltage switching signals have the level value of “00”, and the voltage switching circuit 12 controls a first power source input terminal to be in an on state. When the controller 11 outputs the low level signals on the first control terminal and the high level signals on the second control terminal, the voltage switching circuit 12 detects that the voltage switch signals have the level value of “01”, and the voltage switching circuit 12 controls a second power source input terminal to be in an on state. When the controller 11 outputs the high level signals on the first control terminal and the low level signals on the second control terminal, the voltage switching circuit 12 detects that the voltage switching signals have the level value of “10”, and the voltage switching circuit 12 controls a third power source input terminal to be in an on state. When the controller 11 controls the first control terminal and the second control terminals to output the high level signals, the voltage switching circuit 12 detects that the voltage switching signals have the level value of “11”, and the voltage switching circuit 12 controls a fourth power source input terminal to be in an on state.

Embodiment c: the number of control terminals on a voltage switching circuit 12 is one. A controller 11 can send voltage switching signals in the Embodiment a in a serial manner. n level signals are sent each time. A sequence of then level signals is the same as a sequence of n power source input terminals, so that the voltage switching circuit 12 can determine the power source input terminal that needs to be turned on, according to a value of each of the n level signals. In some embodiments, the controller 11 sends the voltage switching signals in the Embodiment b in a serial manner. m level signals are sent each time. The controller 11 determines the power source input terminal that needs to be turned on, according to a value of the m level signals. In some embodiments, owing to the arrangement of only one control terminal, the reverse bias signals are dynamically adjusted, which can reduce hardware complexity of the circuit.

An operating manner of the laser receiving circuit of some embodiments is as follows: the controller 11 sends the voltage switching signals to the voltage switching circuit 12 via the control terminal. A type of the voltage switching signals can be digital signals or analog signals. The voltage switching circuit 12 receives the voltage switching signals, selects one power source input terminal from the n voltage source input terminals based on the voltage switching signals, and selects one power source input terminal from the n power source input terminals to be turned on in response to the voltage switching signals. Therefore, the corresponding voltage source loads the reverse bias signals to the receiving sensor via the selected power source input terminal and the power source output terminal. Only one of the n power source input terminals is in an on state, that is, in addition to the selected voltage source in the n voltage sources, other voltage sources do not output their reverse bias signals to the receiving sensor. The response time of adjusting the reverse bias signals in some embodiments is mainly the time to turn on the power source input terminal. By turning on different power source input terminals, the reverse bias signals generated by the voltage sources of different voltage values are loaded to the receiving sensor, and the reverse bias signals are dynamically adjusted. The time to turn on the power source input terminal is much shorter than voltage conversion time. Therefore, the present application can reduce the response time of adjusting the reverse bias signals.

For example, the voltage switching circuit 12 receives the voltage switching signals from the controller 11, and selects the power source input terminal needed to be turned on from then power source input terminals according to the voltage switching signals. It is assumed that the power source input terminal needed to be turned on is a power source input terminal 2. The voltage switching circuit 12 controls the power source input terminal 2 to be in an on state, and controls other power source input terminals to be in an off state. Therefore, the voltage source 2 loads the reverse bias signals to the receiving sensor 13 via the power source input terminal 2 and the power source output terminal of the voltage switching circuit.

In one or more embodiments, n=2, the n voltage sources are a first voltage source and a second voltage source. The control terminals provided by the voltage switching circuit are the first control terminal and a second control terminal.

Figure 3:
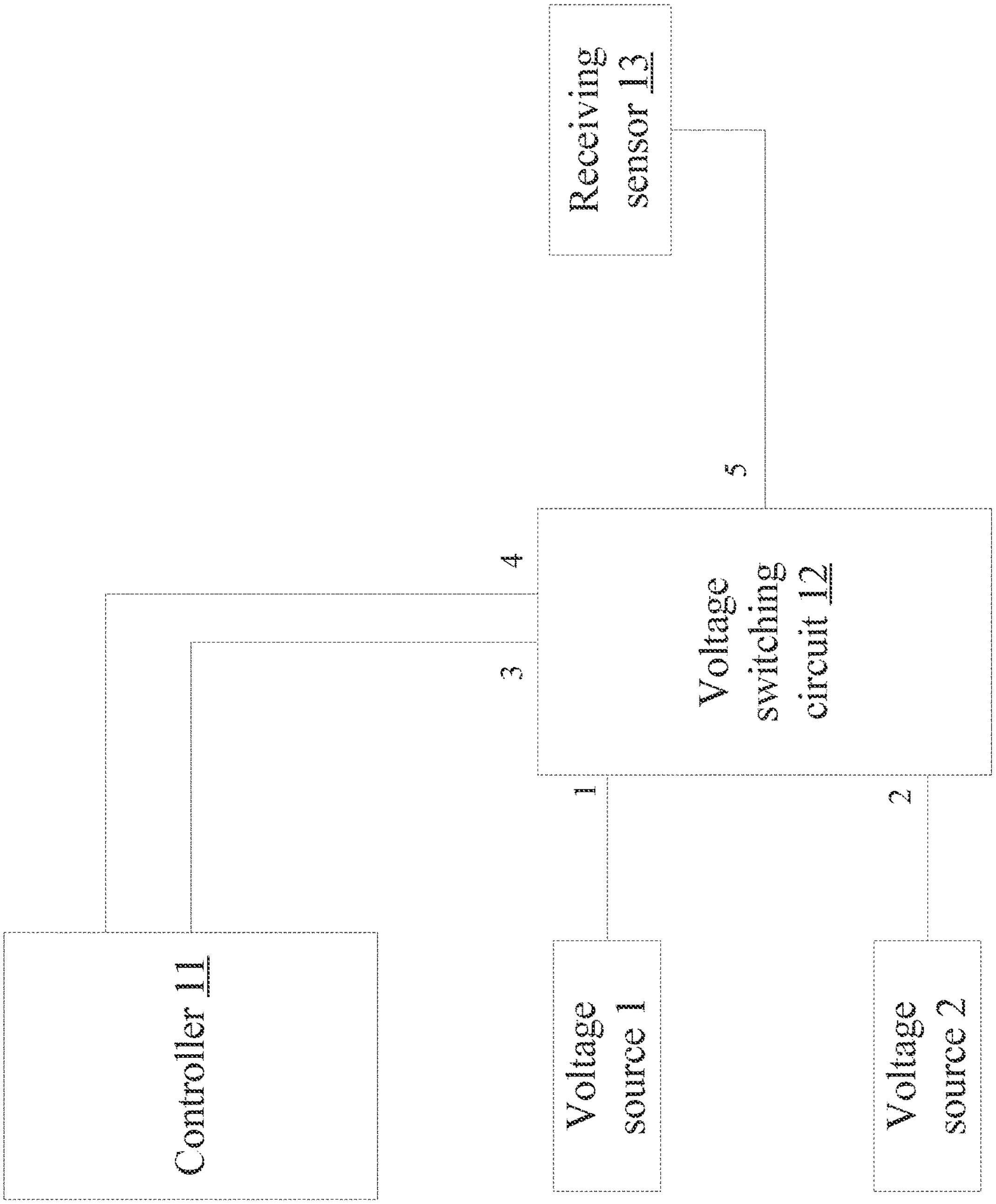
FIG. 3 is yet another schematic structural diagram of a laser receiving circuit according to some embodiments of the present application.

For example: referring to a schematic structural diagram of a laser receiving circuit shown in FIG. 3, a voltage switching circuit 12 is provided with a power source input terminal 1 and a power source input terminal 2. A voltage source 1 is connected to the voltage switching circuit 12 via the power source input terminal 1. A voltage source 2 is connected to the voltage switching circuit 12 via the power source input terminal 2.

The voltage switching circuit 12 is also provided with a first control terminal 3 and a second control terminal 4. A first pin of a controller 11 is connected to the voltage switching circuit 12 via the first control terminal 3. A second pin of the controller 11 is connected to the voltage switching circuit 12 via the second control terminal 4. A voltage output terminal of the voltage switching circuit 12 is connected to a cathode of a receiving sensor 13.

An operating manner of the laser receiving circuit of some embodiments includes: the controller 11 sends the voltage switching signals via the first control terminal 3 and the second control terminal 4. The voltage switching signals are level signals. The voltage switching circuit 12 detects a level value of the voltage switching signals, determines the corresponding power source input terminal according to a mapping relationship between the level value and the power source input terminal, and then turns on the power source input terminal while controlling other power source input terminals to keep an off state at the same time. Therefore, the reverse bias signals of the voltage source corresponding to the power source input terminal are loaded to the receiving sensor, thereby dynamically adjusting the reverse bias signals.

For example: the mapping relationship between the level value and the power source input terminal is shown in Table 3.

TABLE 3

| Level value | Power source input terminal |
|---|---|
| 10 | 1 |
| 01 | 2 |

It is assumed that the controller sends high level signals on the first control terminal 3 and low level signals on the second control terminal 4. The voltage switching circuit 12 detects that the level value is 10, and determines according to Table 3 that the power source input terminal 1 needs to be turned on while controlling the power source input terminal 2 to keep an off state. When the power source input terminal 1 is in an on state, the reverse bias signals generated by the voltage source 1 are loaded to the receiving sensor 13, thereby rapidly adjusting the reverse bias signals.

Figure 4:
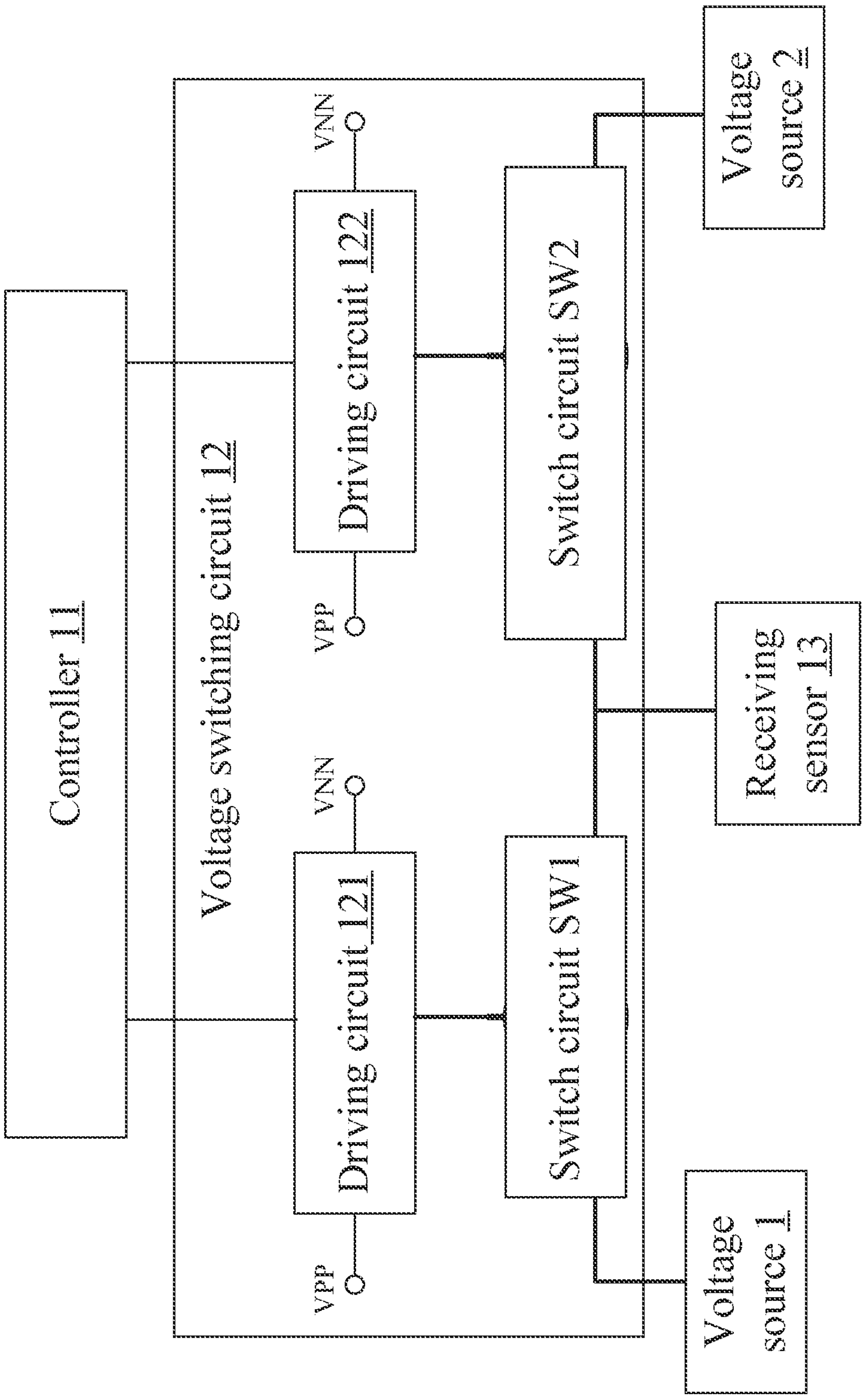
FIG. 4 is yet another schematic structural diagram of a laser receiving circuit according to some embodiments of the present application.

Referring to FIG. 4, which is yet another structural diagram of a voltage switching circuit according to some embodiments of the present application. In some embodiments, n=2, and the voltage switching circuit 12 includes a first driving circuit 121, a switch circuit SW1, a second driving circuit 122, and a switch circuit SW2.

The first driving circuit 121 is connected to a first control terminal of a controller 11. The first driving circuit 121 is connected to the switch circuit SW1. The switch circuit SW1 is connected to a voltage source 1 and a receiving sensor 13. The second driving circuit 122 is connected to a second control terminal of the controller 11. The switch circuit SW2 is connected to a voltage source 2 and the receiving sensor 13. The first driving circuit 121 is configured to control an on state or an off state of the switch circuit SW1 according to instructions of the controller 11. The second driving circuit 122 is configured to control an on state or an off state of the switch circuit SW2 according to the instructions of the controller 11. Only one of the switch circuit SW1 and the switch circuit SW2 is in an on state. When the switch circuit SW1 is in an on state, the reverse bias signals output by the voltage source 1 are loaded to the receiving sensor 13. When the switch circuit SW2 is in an on state, the reverse bias signals output by the voltage source 2 are loaded to the receiving sensor 13, thereby rapidly switching the reverse bias signals of different voltage values on the receiving sensor 13.

The switch circuit SW1 and the switch circuit SW2 of some embodiments can include one or more switch transistors. A type of the switch transistor can be a MOS transistor or a triode. The MOS transistor can be an NMOS transistor or a PMOS transistor. Exemplary structures of the switch circuit SW1 and the switch circuit SW2 can be referred to the description of FIG. 5 to FIG. 7.

Figure 5:
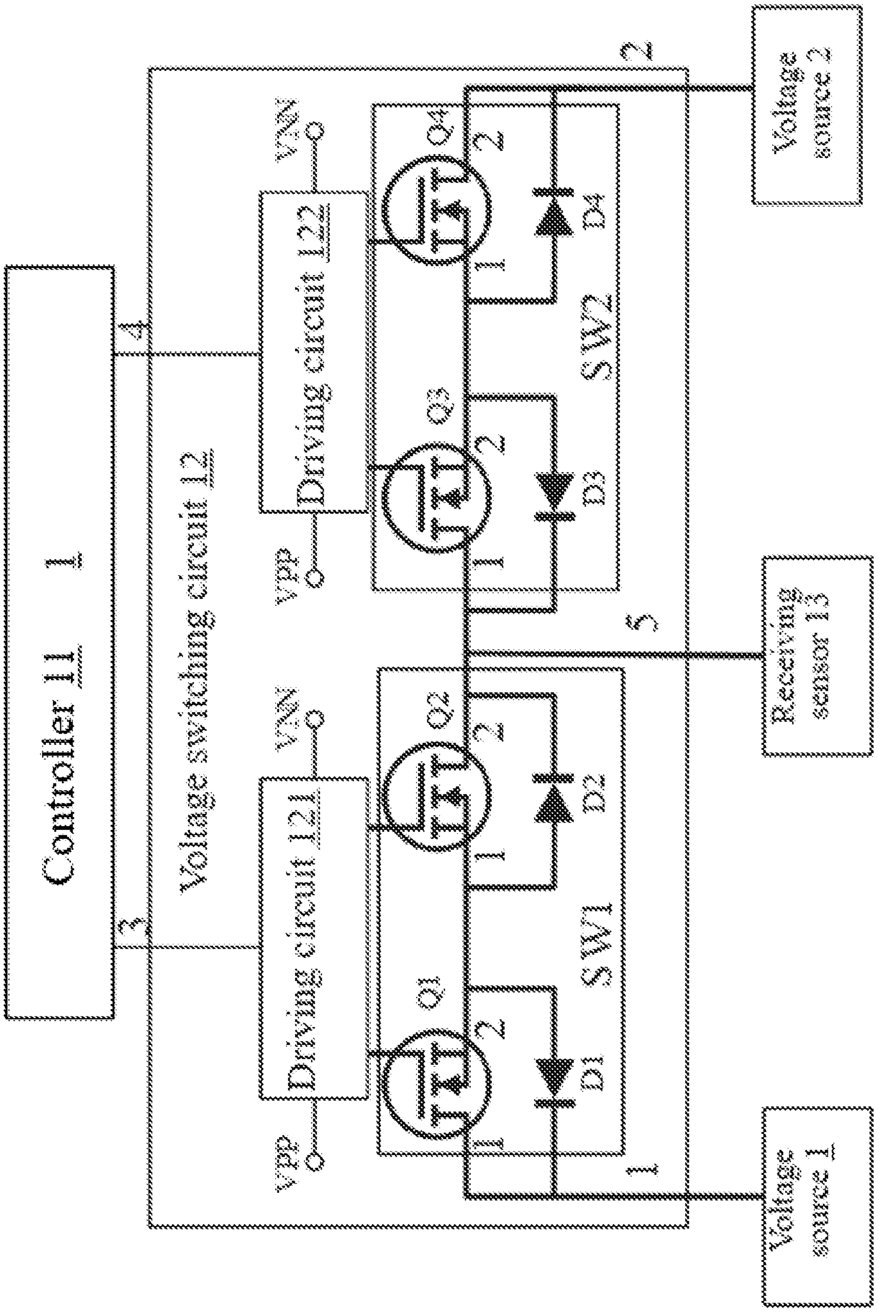
FIG. 5 is yet another schematic structural diagram of a laser receiving circuit according to some embodiments of the present application.

In an exemplary implementation, referring to FIG. 5, which is yet another structural diagram of a voltage switching circuit according to some embodiments of the present application. In some embodiments, switch circuits SW1 and SW2 are MOS transistors, n=2. The voltage switching circuit 12 is provided with a first control terminal 3 and a second control terminal 4. N voltage sources include a voltage source 1 and a voltage source 2.

The voltage switching circuit 12 includes a first driving circuit 121, a second driving circuit 122, a first MOS transistor Q1, a second MOS transistor Q2, a third MOS transistor Q3, a fourth MOS transistor Q4, a first diode D1, a second diode D2, a third diode D3, and a fourth diode D4. The first driving circuit 121 is provided with a first terminal, a second terminal, a third terminal, and an auxiliary power source terminal. The second driving circuit 122 is provided with a first terminal, a second terminal, a third terminal, and an auxiliary power source terminal. The auxiliary power source terminals of the first driving circuit 121 and the second driving circuit 122 are configured to input high-voltage operating signals.

The auxiliary power source terminal of the first driving circuit 121 is connected to a high-voltage power source. The first terminal of the first driving circuit 121 is connected to the first control terminal. The second terminal of the first driving circuit 121 is connected to a gate of the first MOS transistor Q1. The third terminal of the first driving circuit 121 is connected to a gate of the second MOS transistor Q2. A drain 1 of the first MOS transistor Q1 is connected to the voltage source 1. A source 2 of the first MOS transistor Q1 is connected to a source 1 of the second MOS transistor Q2. A cathode of the first diode D1 is connected to the drain 1 of the first MOS transistor Q1. An anode of the first diode D1 is connected to the source 2 of the first MOS transistor Q1. A drain 2 of the second MOS transistor Q2 is connected to a drain 1 of the third MOS transistor Q3 and connected to a cathode of a receiving sensor 13. An anode of the second diode D2 is connected to the source 1 of the second MOS transistor Q2. The cathode of the second diode D2 is connected to the drain 2 of the second MOS transistor Q2.

The auxiliary power source terminal of the second driving circuit 122 is connected to the high-voltage power source. The first terminal of the second driving circuit 122 is connected to the second control terminal. The second terminal of the second driving circuit 122 is connected to a gate of the third MOS transistor Q3. The third terminal of the second driving circuit 122 is connected to a gate of the fourth MOS transistor Q4. A source 2 of the third MOS transistor Q3 is connected to a source 1 of the fourth MOS transistor Q4. A cathode of the third diode D3 is connected to the drain 1 of the third MOS transistor Q3. An anode of the third diode D3 is connected to the source 2 of the third MOS transistor Q3. A drain 2 of the fourth MOS transistor Q4 is connected to the voltage source 2. An anode of the fourth diode D4 is connected to the source 1 of the fourth MOS transistor Q4. A cathode of the fourth diode D4 is connected to the drain 2 of the fourth MOS transistor 4.

The first driving circuit 121 and the second driving circuit 122 are configured to drive the MOS transistor to be in an on state or an off state. The first driving circuit 121 is provided with the auxiliary power source terminal. The high-voltage power source supplies power to the first driving circuit 121 via the auxiliary power source terminal. A power supply mode can be a single-phase power supply. Then the first driving circuit 121 only needs to be provided with one auxiliary power source terminal. If the power supply mode of the first driving circuit 121 is a two-phase power supply, the first driving circuit 121 can be provided with two voltage power source terminals. One auxiliary power source terminal provides negative voltage signals for the first driving circuit 121, and the other auxiliary power source terminal provides positive voltage signals for the first driving circuit 121. For example: the first driving circuit 121 shown in FIG. 5 is provided with an auxiliary power source terminal VPP and an auxiliary power source terminal VNN. The auxiliary power source terminal VPP is configured to input the positive voltage signals. The auxiliary power source terminal VNN is configured to input the negative voltage signals.

An operating principle of the voltage switching circuit in some embodiments is as follows.

The controller 11 sends first level signals to the first driving circuit 121 via the first control terminal 3, and sends the first level signals to the second driving circuit 122 via the second control terminal 4. Only one of the first level signals and the second level signals is high level signals. When the first level signals are the high level signals and the second level signals are low level signals, the first driving circuit 121 controls the first MOS transistor Q1 and the second MOS transistor Q2 to be in an on state, so that the reverse bias signals on the voltage source 1 are loaded to the receiving sensor 13. The second driving circuit 122 controls the third MOS transistor Q3 and the fourth MOS transistor Q4 to be in an off state, and the reverse bias signals of the voltage source 2 are not being output.

When the first level signals are the low level signals and the second level signals are the high level signals, the second driving circuit 122 controls the third MOS transistor Q3 and the fourth MOS transistor Q4 to be in an on state, so that the reverse bias signals generated by the voltage source 2 are loaded to the receiving sensor 13. The first driving circuit 121 controls the first MOS transistor Q1 and the second MOS transistor Q2 to be in an off state, and the reverse bias signals of the voltage source 1 are not being output.

According to the forgoing adjustment process, a reverse voltage loaded to the receiving sensor 13 can be quickly switched between the voltage source 1 and the voltage source 2. It should be noted that the forgoing operating process is only an exemplary description and does not limit the scope of the present application. In the forgoing example, the high level signals correspond to an on state, and the low level signals correspond to an off state. In some implementations, the high level signals correspond to an off state, and the low level signals correspond to an on state.

The first diode D1 is an internal parasitic diode of the first MOS transistor Q1. The second diode D2 is an internal parasitic diode of the second MOS transistor Q2. The third diode D3 is an internal parasitic diode of the third MOS transistor Q3. The fourth diode D4 is an internal parasitic diode of the fourth MOS transistor Q4.

Figure 6:
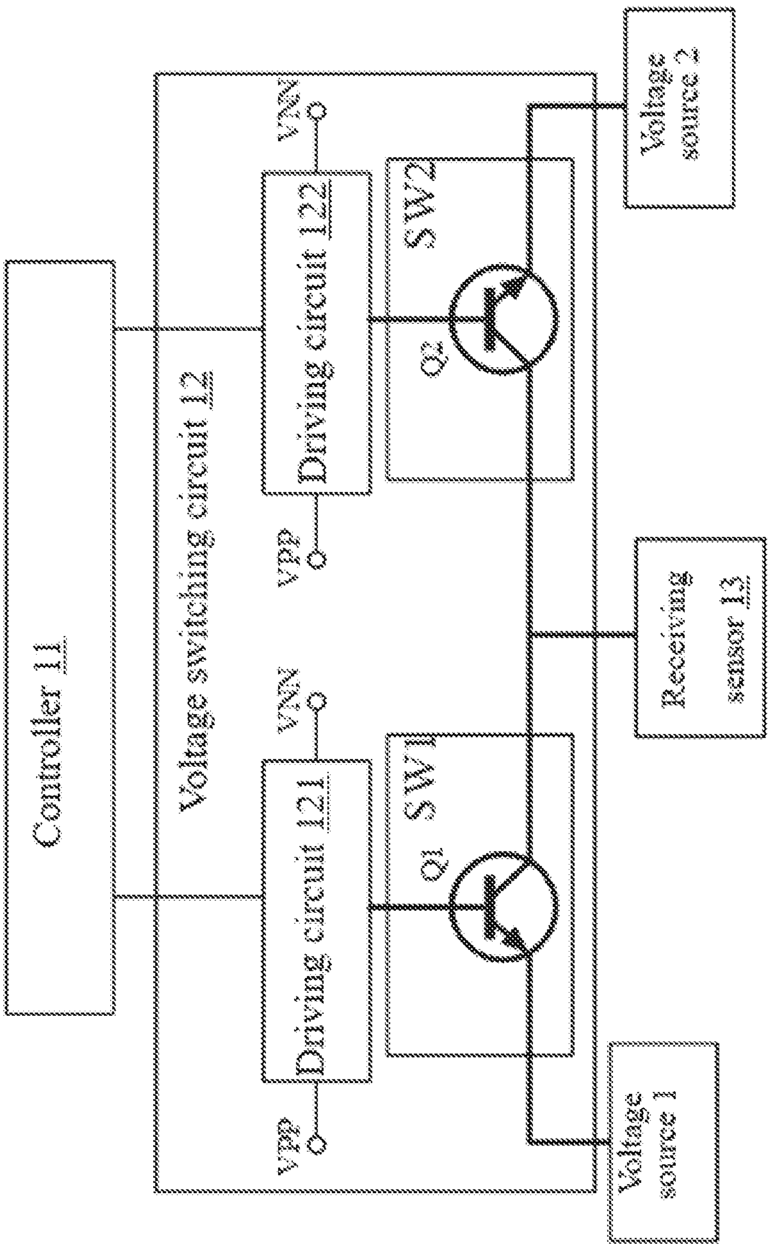
FIG. 6 is yet another schematic structural diagram of a laser receiving circuit according to some embodiments of the present application.

In yet another implementation, referring to FIG. 6, which is yet another structural schematic diagram of a voltage switching circuit according to some embodiments of the present application. In some embodiments, the switch transistors included in the switch circuits SW1 and SW2 are triodes, n=2. The voltage switching circuit 12 is provided with a first control terminal 3 and a second control terminal 4. The n voltage sources include the voltage source 1 and the voltage source 2.

The voltage switching circuit 12 includes the first driving circuit 121, the second driving circuit 122, a first triode Q1, and a second triode Q2. The first driving circuit 121 is provided with the first terminal, the second terminal, and the auxiliary power source terminal. The second driving circuit 122 is provided with the first terminal, the second terminal, and the auxiliary power source terminal. The auxiliary power source terminals of the first driving circuit 121 and the second driving circuit 122 are configured to input the high-voltage operating signals.

The auxiliary power source terminal of the first driving circuit 121 is connected to the high-voltage power source. The first terminal of the first driving circuit 121 is connected to the first control terminal of the controller 11. The second terminal of the first driving circuit 121 is connected to a base of the first triode Q1. An emitter of the first triode Q1 is connected to the voltage source 1. A collector of the first transistor Q1 is connected to a cathode of the receiving sensor 13. The auxiliary power source terminal of the second driving circuit 122 is connected to the high-voltage power source. The first terminal of the second driving circuit 122 is connected to the second control terminal of the controller 11. The second terminal of the second driving circuit 122 is connected to a base of the second triode Q2. A collector of the second transistor Q2 is connected to the cathode of the receiving sensor 13. An emitter of the second transistor Q2 is connected to the voltage source 2.

The first driving circuit 121 and the second driving circuit 122 are configured to drive the first triode Q1 and the second triode Q2 to be in an on state or an off state. The first driving circuit 121 is provided with the auxiliary power source terminal. The high-voltage power source supplies power to the first driving circuit 121 via the auxiliary power source terminal. A power supply manner can be a single-phase power supply. The first driving circuit 121 is provided with one voltage source terminal. If the power supply mode of the first driving circuit 121 is a two-phase power supply, the first driving circuit 121 can be provided with two voltage power source terminals. One auxiliary power source terminal provides negative voltage signals for the first driving circuit 121, and the other auxiliary power source terminal provides positive voltage signals for the first driving circuit 121. For example, the first driving circuit 121 shown in FIG. 6 is provided with the auxiliary power source terminal VPP and the auxiliary power source terminal VNN. The auxiliary power source terminal VPP is configured to input the positive voltage signals, and the auxiliary power source terminal VNN is configured to input the negative voltage signals.

An operating principle of the voltage switching circuit in some embodiments is as follows.

The controller 11 sends the first level signals to the first driving circuit 121 via the first control terminal, and sends the second level signals to the second driving circuit 122 via the second control terminal. Only one of the first level signals and the second level signals is high level signals. When the first level signals are the high level signals and the second level signals are low level signals, the first driving circuit 121 controls the first triode Q1 to be in an on state, so that the reverse bias signals on the voltage source 1 are loaded to the receiving sensor 13. The second driving circuit 122 controls the second triode Q3 to be in an off state, and the reverse bias signals of the voltage source 2 are not output.

When the first level signals are the low level signals and the second level signal are high level signals, the second driving circuit 122 controls the second triode Q2 to be in an on state, so that the reverse bias signals generated by the voltage source 2 are loaded to the receiving sensor 13. The first driving circuit 121 controls the first triode Q1 to be in an off state, and the reverse bias signals of the voltage source 1 are not output.

According to the forgoing adjustment process, the reverse voltage loaded to the receiving sensor 13 can be quickly switched between the voltage source 1 and the voltage source 2. It should be noted that the forgoing operating process is only an exemplary description and does not limit the scope of the present application. In the forgoing example, the high level signals correspond to an on state, and the low level signals correspond to an off state. In some implementations, the high level signals correspond to an off state, and the low level signals correspond to an on state.

Figure 7:
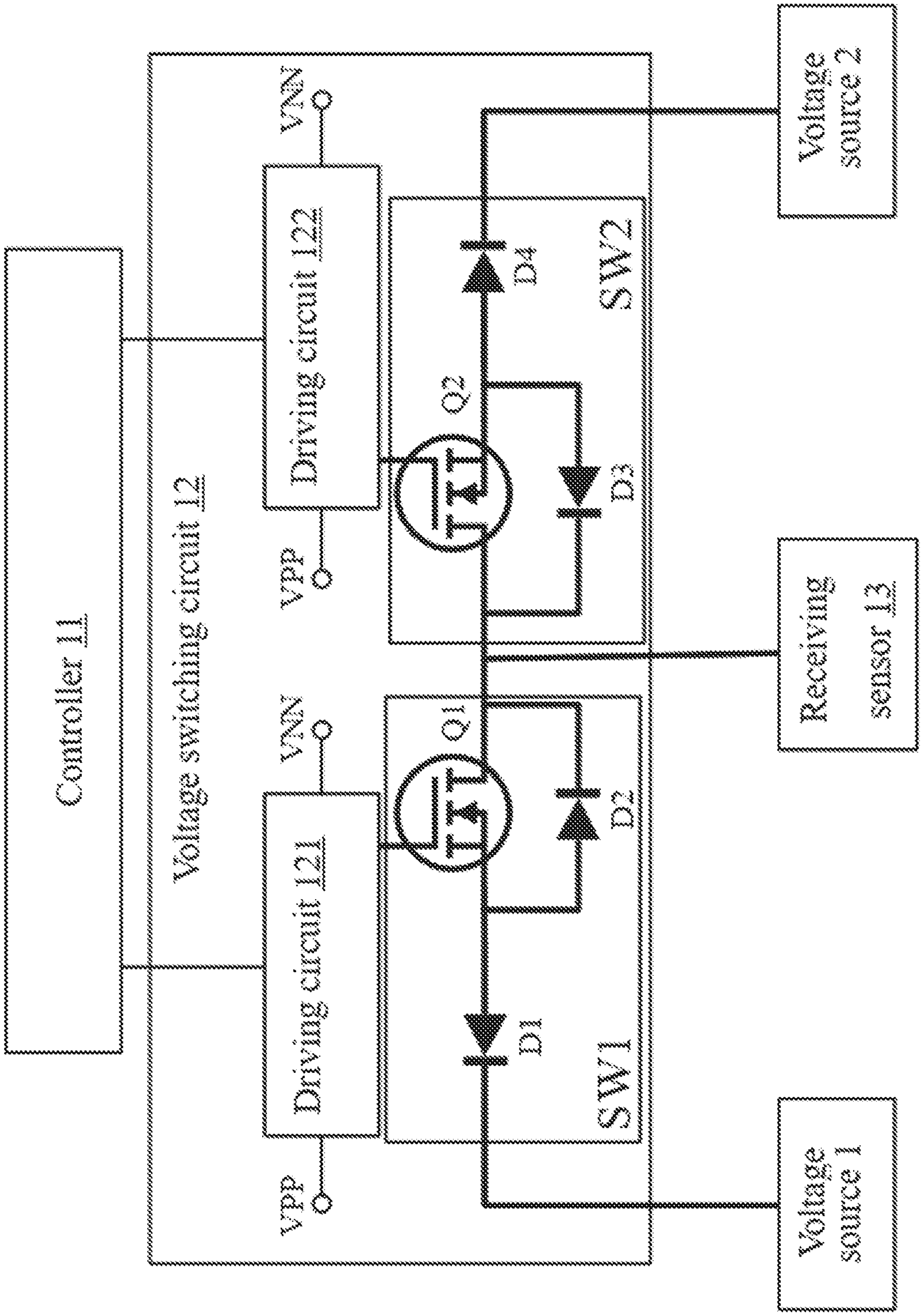
FIG. 7 is a schematic structural diagram of a voltage switching circuit according to some embodiments of the present application.

In another implementation, referring to FIG. 7, which is yet another schematic structural diagram of a voltage switching circuit according to some embodiments of the present application, a voltage switching circuit 12 includes the followings.

In some embodiments, switch transistors included in switch circuits SW1 and SW2 are MOS transistors, n=2. The voltage switching circuit 12 is provided with a first control terminal 3 and a second control terminal 4. N voltage sources include a voltage source 1 and a voltage source 2.

The voltage switching circuit 12 includes a first driving circuit 121, a second driving circuit 122, a first MOS transistor Q1, a second MOS transistor Q2, a first diode D1, a second diode D2, a third diode D3, and a fourth diode D4.

The first driving circuit 121 is provided with a first terminal, a second terminal, and an auxiliary power source terminal. The second driving circuit 122 is provided with a first terminal, a second terminal, and an auxiliary power source terminal. The auxiliary power source terminals of the first driving circuit 121 and the second driving circuit 122 are configured to input high-voltage operating signals.

The auxiliary power source terminal of the first driving circuit 121 is connected to a high-voltage power source. The first terminal of the first driving circuit 121 is connected to a first control terminal of a controller 11. The second terminal of the first driving circuit 121 is connected to a gate of the first MOS transistor. A source of the first MOS transistor Q1 is connected to an anode of the first diode D1. A cathode of the first diode D1 is connected to a voltage source 1. An anode of the second diode D2 is connected to the source of the first MOS transistor Q1. A cathode of the second diode D2 is connected to a drain of the first MOS transistor Q1. The drain of the first MOS transistor Q1 is connected to a cathode of a receiving sensor 13.

The auxiliary power source terminal of the second driving circuit 122 is connected to the high-voltage power source. The first terminal of the second driving circuit 122 is connected to a second control terminal of a controller 11. The second terminal of the second driving circuit 122 is connected to a gate of the second MOS transistor Q2. A source of the second MOS transistor Q2 is connected to an anode of the fourth diode D4. A cathode of the fourth diode D4 is connected to the voltage source 2. An anode of the third diode D3 is connected to the source of the second MOS transistor. A cathode of the third diode D3 is connected to a drain of the second MOS transistor Q2. A drain of the second MOS transistor Q2 is connected to the cathode of the receiving sensor 13.

The first driving circuit 121 and the second driving circuit 122 are configured to drive the first MOS transistor Q1 and the second transistor Q2 to be in an on state or an off state. The first driving circuit 121 is provided with the auxiliary power source terminal. The high-voltage power source supplies power to the first driving circuit 121 via the auxiliary power source terminal. A power supply manner can be a single-phase power supply. The first driving circuit 121 only needs to be provided with one voltage source terminal. If the power supply mode of the first driving circuit 121 is a two-phase power supply, the first driving circuit 121 can be provided with two voltage power source terminals. One auxiliary power source terminal provides negative voltage signals for the first driving circuit 121, and the other auxiliary power source terminal provides positive voltage signals for the first driving circuit 121. For example, the first driving circuit 121 shown in FIG. 7 is provided with an auxiliary power source terminal VPP and an auxiliary power source terminal VNN. The auxiliary power source terminal VPP is configured to input the positive voltage signals. The auxiliary power source terminal VNN is configured to input the negative voltage signals.

An operating principle of the voltage switching circuit in some embodiments is as follows.

The controller 11 sends the first level signals to the first driving circuit 121 via the first control terminal, and sends the second level signals to the second driving circuit 122 via the second control terminal. Only one of the first level signals and the second level signals is high level signals. When the first level signals are the high level signals and the second level signals are low level signals, the first driving circuit 121 controls the first MOS transistor Q1 to be in an on state, so that the reverse bias signals on the voltage source 1 are loaded to the receiving sensor 13. The second driving circuit 122 controls the second MOS transistor Q3 to be in an off state, and the reverse bias signals of the voltage source 2 are not being output.

When the first level signals are the low level signals and the second level signal are high level signals, the second driving circuit 122 controls the second MOS transistor Q2 to be in an on state, so that the reverse bias signals generated by the voltage source 2 are loaded to the receiving sensor 13. The first driving circuit 121 controls the first MOS transistor Q1 to be in an off state, and the reverse bias signals of the voltage source 1 are not being output.

According to the forgoing adjustment process, the reverse voltage loaded to the receiving sensor 13 can be quickly switched between the voltage source 1 and the voltage source 2. It should be noted that the forgoing operating process is only an exemplary description and does not limit the scope of the present application. In the forgoing example, the high level signals correspond to an on state, and the low level signals correspond to an off state. In some implementations, the high level signals correspond to an off state, and the low level signals correspond to an on state.

Figure 8:
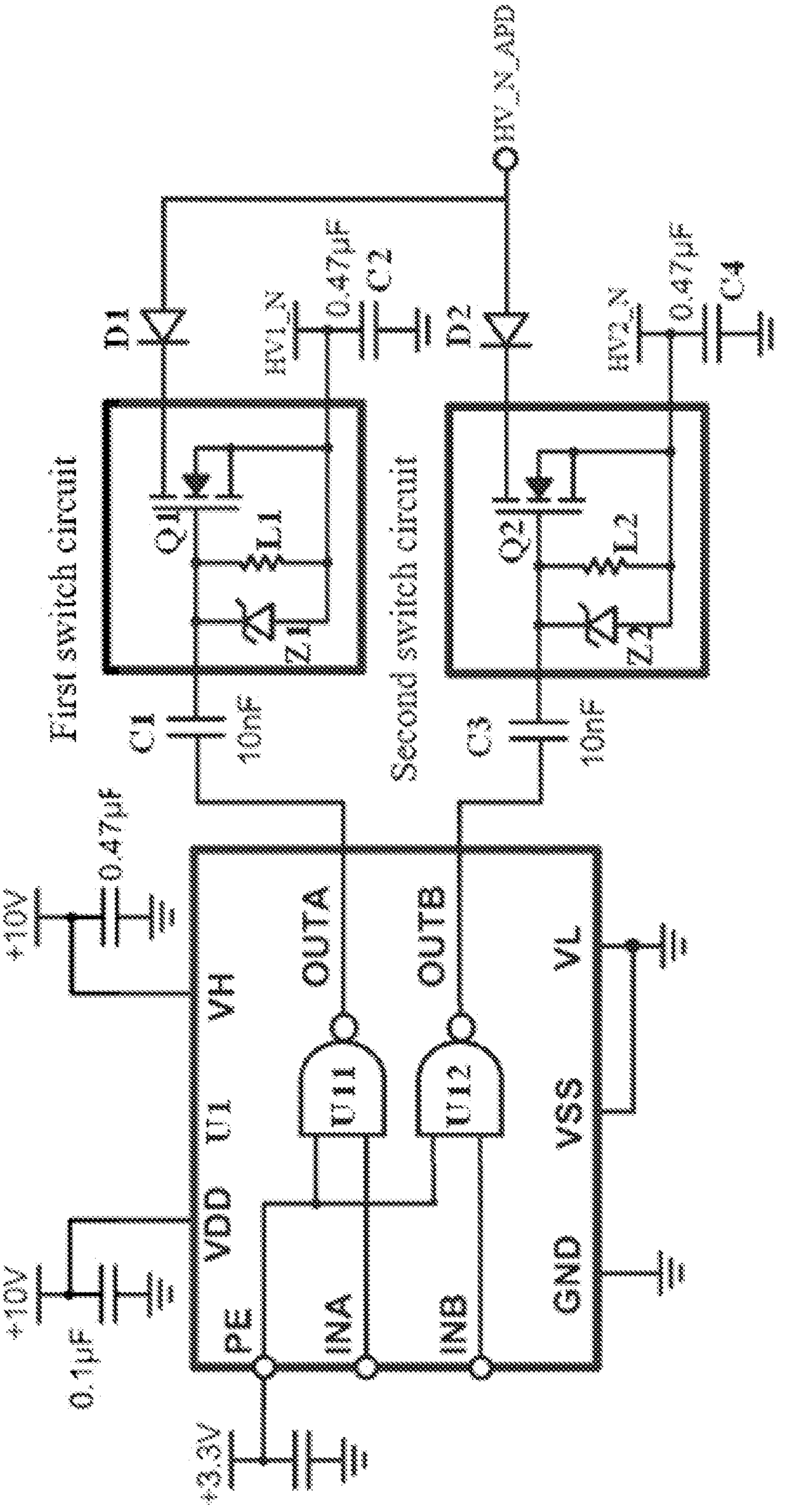
FIG. 8 is yet another schematic structural diagram of a voltage switching circuit according to some embodiments of the present application.

In yet another implementation, referring to FIG. 8, which is yet another schematic structural diagram of a voltage switching circuit according to the present application. In some embodiments, a voltage switching circuit includes a driving chip U1, a first coupling capacitor C1, a second coupling capacitor C3, a first switch circuit, a second switch circuit, a first filter capacitor C2, and a second filter capacitor C4.

A first IO pin INA of the driving chip U1 is connected to a controller. A second IO pin INB of the driving chip U1 is connected to the controller. A third IO pin OUTA of the driving chip U1 is connected to a first terminal of the first coupling capacitor C1. A second terminal of the first coupling capacitor C1 is connected to a first terminal of the first switch circuit. A second terminal of the first switch circuit is connected to a cathode of a first diode D1. An anode of the first diode D1 is connected to a cathode of a receiving sensor HV_N_APD. A second terminal of the first switch circuit is grounded via the first filter capacitor C2, and is connected to a first voltage source HV1_N.

A fourth IO pin OUTB of the driving chip U1 is connected to a first terminal of the second coupling capacitor C3. A second terminal of the second coupling capacitor C3 is connected to a first terminal of the second switch circuit. A second terminal of the second switch circuit is connected to a cathode of a second diode D2. An anode of the second diode D2 is connected to the cathode of the receiving sensor HV_N_APD. A second terminal of the second switch circuit is grounded via the second filter capacitor C4, and is connected to a second voltage source HV2_N.

An operating process of the voltage switching circuit of some embodiments includes: the controller sends level signals to the driving chip U1 via the first IO pin INA and the second IO pin INB. The driving chip U1 receives voltage switching signals from the controller via the first IO pin INA and the second IO pin INB.

Based on the voltage switching signals, first switch-on voltage signals are sent to the first switch circuit via the third IO pin OUTA. The first switch-on voltage signals are configured to control the first switch circuit to be in an on state, so that the reverse bias signals output by the first voltage source HV1_N are loaded to the receiving sensor HV_N_APD. For example: when high level signals are input to a third IO pin INA and low level signals are input to a fourth IO pin INB, the driving chip U1 sends the first voltage switch-on signals to the first switch circuit; or Based on the voltage switching signals, second switch-on voltage signals are sent to the second switch circuit via the fourth IO pin OUTB. The second switch-on voltage signals are configured to control the second switch circuit to be in an on state, so that the reverse bias signals output by the second voltage source HV2_N are loaded to the receiving sensor HV_N_APD. For example, when the low level signals are input to the third IO pin INA and high level signals are input to the fourth IO pin INB, the driving chip U1 sends the second voltage switch-on signals to the second switch circuit. In some embodiments, the states of the first switch circuit and the second switch circuit are directly controlled by the driving chip, and no external high-voltage power source is required, so a high-cost high-voltage device can be saved and hardware costs can be reduced.

Further, the first switch circuit includes a first voltage-stabilizing transistor Z1, a first inductor L1, and a first switch transistor Q1. The second switch circuit includes a second voltage-stabilizing transistor Z2, a second inductor L2, and a second switch transistor A first switch transistor Q1 is an NMOS transistor or a PMOS transistor. The second switch transistor Q2 is an NMOS transistor or a PMOS transistor. A gate is a control terminal of the switch transistor. A drain is a first switch terminal of the switch transistor. A source is a second switch terminal of the switch transistor.

A cathode of the first voltage-stabilizing transistor Z1 is connected to the second terminal of the first coupling capacitor C1. The cathode of the first voltage-stabilizing transistor Z1 is connected to a first terminal of the first inductor L1. The cathode of the first voltage-stabilizing transistor Z1 is connected to a control terminal of the first switch transistor Q1. An anode of the first voltage-stabilizing transistor Z1 is connected to a second terminal of the first inductor L1. The anode of the first voltage-stabilizing transistor Z1 is connected to a second switch terminal of the first switch transistor Q1. A first switch terminal of the first switch transistor Q1 is connected to the cathode of the first diode D1.

A cathode of the second voltage-stabilizing transistor Z2 is connected to the second terminal of the second coupling capacitor C3. The cathode of the second voltage-stabilizing transistor Z2 is connected to a second terminal of the second inductor L2. The cathode of the second voltage-stabilizing transistor Z2 is connected to a control terminal of the second switch transistor Q2. An anode of the second voltage-stabilizing transistor Z2 is connected to the second terminal of the second inductor L2. The anode of the second voltage-stabilizing transistor Z2 is connected to a second switch terminal of the second switch transistor Q2. A first switch terminal of the second switch transistor Q2 is connected to the cathode of the second diode D2.

Further, the driving chip U1 includes: a first AND gate U11 aid a second AND gate U12.

A first input terminal of the first AND gate U11 is connected to an enable pin PE of the driving chip U1. A second input terminal of the first AND gate U11 is connected to a first IO pin INA of the driving chip U1. An output terminal of the first AND gate U11 is connected to a third IO pin OUTA of the driving chip.

A first input terminal of the second AND gate U12 is connected to the enable pin of the driving chip U1. A second input terminal of the second AND gate U12 is connected to a second IO pin INB of the driving chip U1. An output terminal of the second AND gate U12 is connected to a fourth IO pin OUTB of the driving chip U1.

An operating principle of some embodiments includes: a PE pin of the driving chip maintains high level signals (for example, 3.3V high level signals). When the high level signals are input to an INA pin, and the low level signals are input to the INB pin, according to operation rules of the AND gate, an OUTA pin outputs the high level signals, and an OUTB pin outputs the low level signals. Then the first switch transistor Q1 in the first switch circuit is in an on state, and the reverse bias signals on the first voltage source are loaded to the receiving sensor. When the low level signals are input to an INA pin and the high level signals are input to an INB pin, according to the operation rules of the AND gate, the OUTA pin outputs the low level signals and the OUTB pin outputs the high level signals. Then the second switch transistor Q2 in the second switch circuit is in an on state, and the reverse bias signals on the second voltage source are loaded to the receiving sensor. In this way, the reverse bias signals of different voltage values can be quickly switched, so as to achieve an objective of quickly adjusting a gain of the receiving sensor.

The driving chip U1 is also provided with a plurality of power pins and peripheral devices to provide operating voltage signals for the driving chip U1. An exemplary arrangement of the power pin and the connection manner of the peripheral devices can be referred to FIG. 8, which is not repeated here.

Some embodiments of the present application also provide a LiDAR, including the forgoing laser receiving circuit.

In some embodiments, the forgoing laser receiving circuit can be applied to the LiDAR. In addition to the laser receiving circuit, the LiDAR can also include specific structures such as a power supply, a processing device, an optical receiving apparatus, a rotating body, a base, a housing, and a human-computer interaction apparatus, or the like. It can be understood that the LiDAR can be a single-channel LiDAR, and includes one channel of the forgoing laser receiving circuit. The LiDAR can also be a multi-channel LiDAR, and includes a plurality of channels of the forgoing laser receiving circuits and a corresponding control system. The quantity of the laser receiving circuits can be determined according to actual needs.

In the forgoing LiDAR, by presetting a plurality of voltage sources of different voltage values, when adjusting the voltage value of the reverse bias signals of the receiving sensor is needed, the present application only needs to turn on a corresponding power input interface to load the reverse bias signals of a specified voltage value to the receiving sensor. An adjusted response time is mainly the time to turn on a corresponding power input port. Technical solutions of the present application have a faster response speed.

All or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory, or the random storage memory, and so on.

The disclosed forgoing are only exemplary embodiments of the present application, which of course cannot be used to limit the scope of rights of the present application. Therefore, equivalent changes made in accordance with the claims of the present application still fall within the scope of the application.

The invention claimed is:

1. A laser receiving circuit, comprising:

a controller, a voltage switching circuit, n voltage sources, and a receiving sensor, wherein:

the voltage switching circuit comprises a control terminal, n power source input terminals, and a power source output terminal;

the n voltage sources generate reverse bias signals of different voltage values, respectively, and the n voltage sources are connected to the n power source input terminals in a one-to-one manner;

the controller is connected to the control terminal of the voltage switching circuit and is configured to send voltage switching signals to the voltage switching circuit via the control terminal;

the power source output terminal is connected to a cathode of the receiving sensor; and the voltage switching circuit is configured to select one power source input terminal from the n power source input terminals to be turned on, in response to the voltage switching signals, wherein n=2, the n voltage sources comprise a first voltage source and a second voltage source, and the control terminal provided by the voltage switching circuit comprises a first control terminal and a second control terminal;

wherein the voltage switching circuit comprises a driving chip, a first coupling capacitor, a second coupling capacitor, a first switch circuit, a second switch circuit, a first filter capacitor, and a second filter capacitor;

wherein a first IO pin of the driving chip is connected to the controller, a second IO pin of the driving chip is connected to the controller, a third IO pin of the driving chip is connected to a first terminal of the first coupling capacitor, a second terminal of the first coupling capacitor is connected to a first terminal of the first switch circuit, a second terminal of the first switch circuit is connected to a cathode of a first diode, an anode of the first diode is connected to the cathode of the receiving sensor, a second terminal of the first switch circuit is grounded via the first filter capacitor, and is connected to the first voltage source;

wherein a fourth IO pin of the driving chip is connected to a first terminal of the second coupling capacitor, a second terminal of the second coupling capacitor is connected to the first terminal of the second switch circuit, a second terminal of the second switch circuit is connected to the cathode of a second diode, the anode of the second diode is connected to the cathode of the receiving sensor, the second terminal of the second switch circuit is grounded via the second filter capacitor, and is connected to the second voltage source;

wherein the driving chip is configured to receive voltage switching signals from the controller via the first IO pin and the second IO pin; and wherein:

based on the voltage switching signals, first switch-on voltage signals are sent to the first switch circuit via the third IO pin, wherein the first switch-on voltage signals are configured to control the first switch circuit to be in an on state, so that the reverse bias signals output by the first voltage source are loaded to the receiving sensor; or based on the voltage switching signals, second switch-on voltage signals are sent to the second switch circuit via the fourth IO pin, the second switch-on voltage signals are configured to control the second switch circuit to be in an on state, so that the reverse bias signals output by the second voltage source are loaded to the receiving sensor.

2. The laser receiving circuit according to claim 1, wherein the voltage switching circuit comprises a first driving circuit, a first switch circuit, a second driving circuit, and a second switch circuit; the first switch circuit and the second switch circuit comprises one or more switch transistors, the switch transistor is a triode or a MOS transistor; the first driving circuit and the second driving circuit are provided with an auxiliary power source terminal, and the auxiliary power source terminals of the first driving circuit and the second driving circuit are configured to input high-voltage operating signals, wherein the first driving circuit is connected to the first control terminal of the controller, the first driving circuit is connected to the first switch circuit, and the first switch circuit is connected to the first voltage source and the cathode of the receiving sensor; and wherein the second driving circuit is connected to the second control terminal of the controller, the second driving circuit is connected to the second switch circuit, and the second switch circuit is connected to the second voltage source and the cathode of the receiving sensor.

3. The laser receiving circuit according to claim 2, wherein the first switch circuit comprises a first MOS transistor, a second MOS transistor, a first diode, and a second diode; and the second switch circuit comprises a third MOS transistor, a fourth MOS transistor, a third diode, and a fourth diode;

wherein the first driving circuit is further provided with a first terminal, a second terminal, and a third terminal, and the second driving circuit is further provided with a first terminal, a second terminal, and a third terminal;

wherein an auxiliary power source terminal of the first driving circuit is connected to a high-voltage power source, the first terminal of the first driving circuit is connected to the first control terminal, the second terminal of the first driving circuit is connected to a gate of the first MOS transistor, the third terminal of the first driving circuit is connected to a gate of the second MOS transistor, a drain of the first MOS transistor is connected to the first voltage source, a source of the first MOS transistor is connected to a source of the second MOS transistor, a cathode of the first diode is connected to the drain of the first MOS transistor, an anode of the first diode is connected to the source of the first MOS transistor, a drain of the second MOS transistor is connected to a drain of the third MOS transistor and connected to a cathode of a receiving sensor, an anode of the second diode is connected to the source of the second MOS transistor, and the cathode of the second diode is connected to the drain of the second MOS transistor; and wherein the auxiliary power source terminal of the second driving circuit is connected to the high-voltage power source, the first terminal of the second driving circuit is connected to the second control terminal, the second terminal of the second driving circuit is connected to a gate of the third MOS transistor, the third terminal of the second driving circuit is connected to a gate of the fourth MOS transistor, a source of the third MOS transistor is connected to a source of the fourth MOS transistor, a cathode of the third diode is connected to the drain of the third MOS transistor, an anode of the third diode is connected to the source of the third MOS transistor, a drain of the fourth MOS transistor is connected to the second voltage source, an anode of the fourth diode is connected to the source of the fourth MOS transistor, and a cathode of the fourth diode is connected to the drain of the fourth MOS transistor.

4. The laser receiving circuit according to claim 3, wherein the first diode is an internal parasitic diode of a first switch transistor, the second diode is an internal parasitic diode of a second switch transistor, the third diode is an internal parasitic diode of a third switch transistor, and the fourth diode is an internal parasitic diode of a fourth switch transistor.

5. The laser receiving circuit according to claim 2, wherein the first switch circuit comprises a first triode, and the second switch circuit comprises a second triode;

wherein a base of the first triode is connected to the first driving circuit, an emitter of the first triode is connected to the first voltage source, and a collector of the first triode is connected to the cathode of the receiving sensor; and wherein a base of the second triode is connected to the second driving circuit, an emitter of the second triode is connected to the second voltage source, and a collector of the second triode is connected to the cathode of the receiving sensor.

6. The laser receiving circuit according to claim 2, wherein the first switch circuit comprises a first MOS transistor, a first diode, and a second diode, and the second switch circuit comprises a second MOS transistor, a third diode, and a fourth diode;

wherein the cathode of the first diode is connected to the first voltage source, an anode of the first diode is connected to a source of the first MOS transistor and connected to an anode of the second diode, a gate of the first MOS transistor is connected to the first driving circuit, and a drain of the first MOS transistor is connected to the cathode of the second diode and connected to the cathode of the receiving sensor; and wherein the cathode of the second diode is connected to the second voltage source, the anode of the second diode is connected to a source of the second MOS transistor and connected to an anode of the third diode, a gate of the second MOS transistor is connected to the second driving circuit, a the drain of the second MOS transistor is connected to the cathode of the third diode and connected to the cathode of the receiving sensor.

7. The laser receiving circuit according to claim 2, wherein the auxiliary power source terminal of the first driving circuit comprises a positive auxiliary power source terminal for inputting positive voltage signals and a negative auxiliary power source terminal for inputting negative voltage signals, and the auxiliary power source terminal of the second driving circuit comprises a positive auxiliary power source terminal for inputting the positive voltage signals and a negative auxiliary power source terminal for inputting the negative voltage signals.

8. The laser receiving circuit according to claim 1, wherein the first switch circuit comprises a first voltage-stabilizing transistor, a first inductor, and a first switch transistor, and the second switch circuit comprises a second voltage-stabilizing transistor, a second inductor, and a second switch transistor;

wherein a cathode of the first voltage-stabilizing transistor is connected to the second terminal of the first coupling capacitor, the cathode of the first voltage-stabilizing transistor is connected to a first terminal of the first inductor, the cathode of the first voltage-stabilizing transistor is connected to a control terminal of the first switch transistor, an anode of the first voltage-stabilizing transistor is connected to a second terminal of the first inductor, the anode of the first voltage-stabilizing transistor is connected to a second switch terminal of the first switch transistor, a first switch terminal of the first switch transistor is connected to the cathode of the first diode; and wherein a cathode of the second voltage-stabilizing transistor is connected to the second terminal of the second coupling capacitor, the cathode of the second voltage-stabilizing transistor is connected to a second terminal of the second inductor, the cathode of the second voltage-stabilizing transistor is connected to a control terminal of the second switch transistor, an anode of the second voltage-stabilizing transistor is connected to the second terminal of the second inductor, the anode of the second voltage-stabilizing transistor is connected to a second switch terminal of the second switch transistor, and a first switch terminal of the second switch transistor is connected to the cathode of the second diode.

9. The laser receiving circuit according to claim 1, wherein the driving chip comprises a first AND gate and a second AND gate;

wherein a first input terminal of the first AND gate is connected to an enable pin of the driving chip; a second input terminal of the first AND gate is connected to the first IO pin of the driving chip; and an output terminal of the first AND gate is connected to the third IO pin of the driving chip;

wherein a first input terminal of the second AND gate is connected to the enable pin of the driving chip; and wherein a second input terminal of the second AND gate is connected to the second IO pin of the driving chip, and an output terminal of the second AND gate is connected to the fourth IO pin of the driving chip.

* * * * *